United States Patent
Stiesdal et al.

(10) Patent No.: US 8,294,404 B2
(45) Date of Patent: Oct. 23, 2012

(54) METHOD AND ARRANGEMENT TO ADJUST AN AIR-GAP

(75) Inventors: Henrik Stiesdal, Odense C (DK); Erik Wolf, Röttenbach (DE)

(73) Assignee: Siemens Aktiengesellschaft, München (DE)

( * ) Notice: Subject to any disclaimer, the term of this patent is extended or adjusted under 35 U.S.C. 154(b) by 353 days.

(21) Appl. No.: 12/751,317

(22) Filed: Mar. 31, 2010

(65) Prior Publication Data
US 2010/0253272 A1   Oct. 7, 2010

(30) Foreign Application Priority Data
Apr. 3, 2009   (EP) .................................. 09004984

(51) Int. Cl.
*H02K 1/00* (2006.01)
*H02K 23/44* (2006.01)
(52) U.S. Cl. ......................................... 318/540; 310/90
(58) Field of Classification Search .................. 318/538, 318/540; 310/90
See application file for complete search history.

(56) References Cited

U.S. PATENT DOCUMENTS

| | | | | |
|---|---|---|---|---|
| 3,735,717 A * | 5/1973 | VonBrimer et al. | ........... | 112/220 |
| 3,789,285 A * | 1/1974 | Nishizawa | ..................... | 318/687 |
| 4,045,696 A * | 8/1977 | Lutz et al. | .................. | 310/49.43 |
| 4,626,754 A * | 12/1986 | Habermann et al. | .......... | 318/460 |
| 5,157,296 A * | 10/1992 | Trumper | ...................... | 310/90.5 |
| 5,406,180 A * | 4/1995 | Feller, Jr. | ...................... | 318/372 |
| 5,627,419 A * | 5/1997 | Miller | ............................. | 310/74 |
| 5,770,908 A * | 6/1998 | Kim | ................................ | 310/90 |
| 6,455,975 B1 * | 9/2002 | Raad et al. | ..................... | 310/209 |
| 6,469,412 B1 * | 10/2002 | Patarchi | ......................... | 310/158 |
| 7,501,782 B2 * | 3/2009 | Buhler et al. | .................. | 318/607 |
| 8,058,758 B2 * | 11/2011 | Ries | ................................ | 310/90.5 |
| 2007/0241628 A1 * | 10/2007 | Himmelmann et al. | ....... | 310/190 |
| 2008/0265702 A1 * | 10/2008 | Yeh | ................................. | 310/90 |

FOREIGN PATENT DOCUMENTS

| GB | 1 296 226 A | 12/1969 |
|---|---|---|
| JP | 08223875 A | 8/1996 |
| WO | WO 2006/005796 A1 | 1/2006 |

* cited by examiner

*Primary Examiner* — Bentsu Ro

(57) ABSTRACT

The electrical machine includes a movable part and a static part. The movable part rotates in relation to the static part around a dedicated rotary axis. An air-gap is located between the rotating and the static part of the machine. A device is positioned and used to measure the spacing of the air-gap. The static part and/or the movable part is coupled with an actuating-unit, which changes the relative position of the static part in relation to the movable part to adjust the spacing of the air-gap.

14 Claims, 4 Drawing Sheets

METHOD AND ARRANGEMENT TO ADJUST AN AIR-GAP

CROSS REFERENCE TO RELATED APPLICATIONS

This application claims priority of European Patent Office application No. 09004984.2 EP filed Apr. 3, 2009, which is incorporated by reference herein in its entirety.

FIELD OF INVENTION

The invention relates to a method and arrangement to adjust an air-gap between a movable part and a static part of an electrical machine.

BACKGROUND OF INVENTION

The air-gap of an electrical machine is the distance between a movable, often rotatable, part of the machine and a static part of the machine. To prevent damages the air-gap has to be designed properly to avoid a mechanical contact between the two parts.

The air-gap has to be designed in a way, that even tolerances of used components within the two parts do not influence the function of the machine.

Even a rotational force or a gravity force or a thermal expansion is acting on the components of the machine, which needs to be considered by designing in the air-gap.

Additionally it is preferred, to achieve a uniform, constant air-gap to avoid a synchronic load cycling of the equipment.

A uniform, constant air-gap also leads to a constant shape of the rotating part of the machine, so an unbalanced rotating mass is avoided.

Right now the air-gap is a result of the manufactured components e.g. rotor/stator and will make its appearance, while the machine is assembled. The air-gap design accounts for the problems stated above, so the air-gap-design results in a maximum possible air-gap with its negative effect on power and efficiency.

SUMMARY OF INVENTION

It is therefore the aim of the invention, to provide an improved method and arrangement to adjust the air-gap of an electrical machine.

These aims are solved by the features of the independent claims.

Improved embodiments of the invention are object of the dependant claims.

The invention relates to a method and arrangement to adjust an air-gap of an electrical machine.

The electrical machine shows a movable part and a static part, while the movable part rotates in relation to the static part around a dedicated rotary axis. The air-gap is located between the rotating and the static part of the machine. A device is positioned and used to measure the spacing of the air-gap. The static part and/or the movable part is coupled with an actuating-unit, which changes the relative position of the static part in relation to the movable part to adjust the spacing of the air-gap.

For example the static part shows a longitudinal axis, which is aligned to the rotary axis of the movable part. The static or the movable part is coupled with an actuating-unit.

By help of the actuating unit it is possible, to change an inclination of the longitudinal axis in reference to the rotary axis, so an adjustment of the air-gap is achieved. The inclination is adjusted in dependency of the measured spacing of the air-gap.

It is also possible to use the actuating unit to shift the longitudinal axis in reference to the rotary axis to adjust the air-gap. This is done if the two axes are parallel and the air-gap needs to be adjusted.

It is also possible, to adjust the inclination and the shift in common, to adjust the air-gap.

The static part shows a longitudinal axis, which is aligned to the rotary axis of the movable part. The static or movable part is coupled with a single actuating-unit or with a number of actuating units in a way that the air-gap can be adjusted as stated above.

The air-gap is adjusted in dependency of the measured spacing of the air-gap.

Combinations of both where static and movable part have dedicated actuating-unit(s) are also covered by this invention.

In another preferred embodiment the movable (rotating) part and/or the static part show segments, so they are built up in a segmented manner. In this case it is possible to adjust the air-gap by a radial movement of the segments. This embodiment can also be combined with the inventive embodiments described above.

In a preferred embodiment the static part and/or the rotating part show a unit for a distance-measurement, which allows to measure the air-gap of the machine even if it is in an operational mode.

The invention is used to adjust the air-gap between parts of a generator in a preferred embodiment—especially of huge generators, which are used for wind-turbines and hydro power turbines for example.

The invention provides an active control and adjustment of the air-gap. The adjustment of the air-gap is allowed even during the operation of the machine.

The invention allows the reduction of cyclic loads of the machine, so its life time is improved.

The invention allows the optimization of the air gap, which improves the efficiency of the machine.

The invention allows the control of a dynamic behavior of the mechanical system of the machine, while an active damping is provided.

BRIEF DESCRIPTION OF THE DRAWINGS

The invention is described in more detail by help of a drawing.

DETAILED DESCRIPTION OF INVENTION

Figure 1:
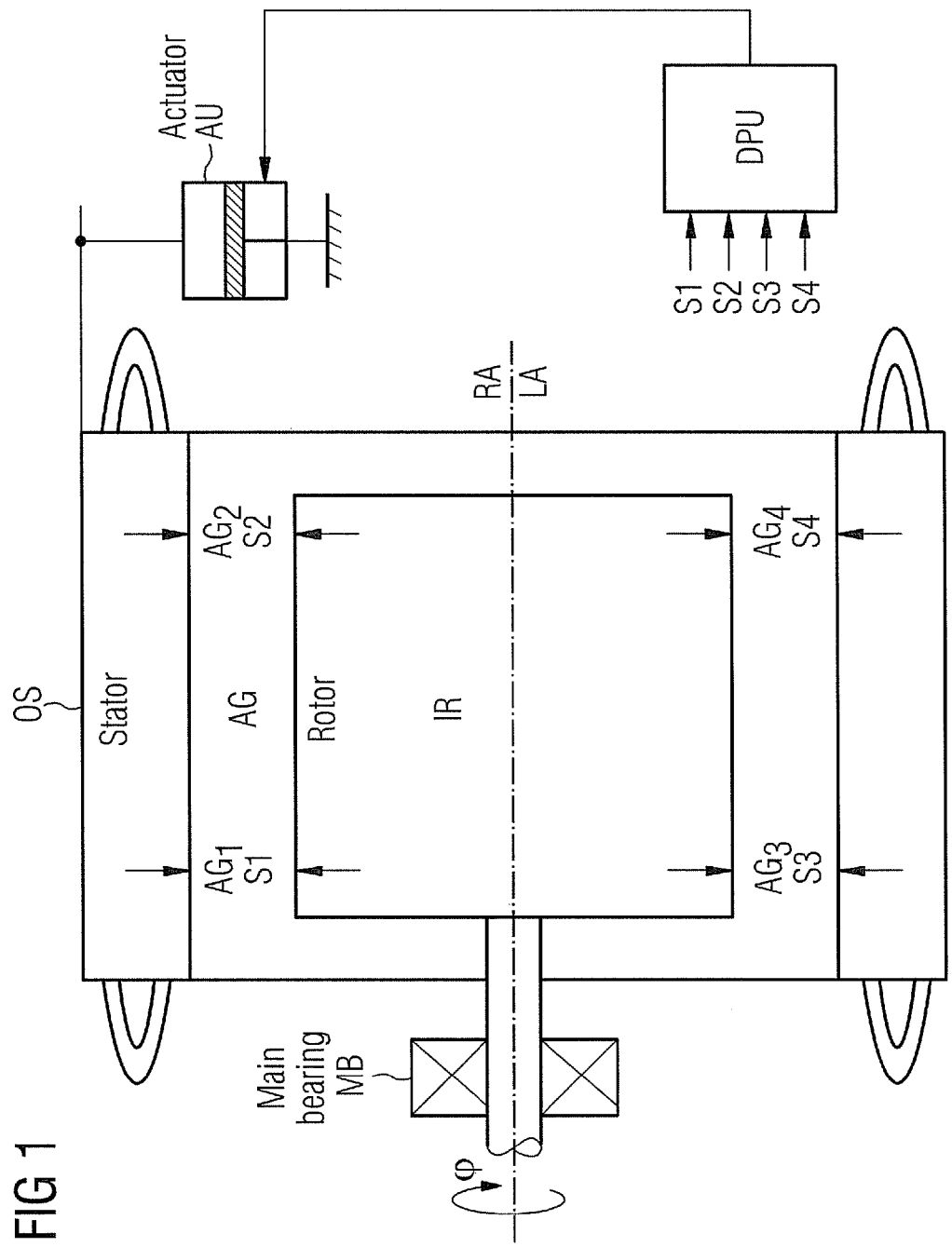
FIG. 1 shows the invention used at an electrical machine with an outer stator and an inner rotor.

FIG. 1 shows the invention used at an electrical machine with an outer stator OS as static part and an inner rotor IR as movable part.

The inner rotor IR rotates around a dedicated rotary axis RA, so a rotation in relation to the outer stator OS is achieved.

The rotation is allowed by help of so called main-bearings MB, where one is shown here.

An air-gap AG is located between the inner rotor IR and the outer stator OS, while the spacing AG1, AG2, AG3, AG4 of the air-gap AG between the inner rotor IR and the outer stator OS is measured at e.g. four positions by help of sensors S1 to S4.

It is also possible to use a rotating line sensor, which is measuring the entire air-gap.

It is also possible to use only one single sensor or even a number of sensors, which might be positioned in a line to measure the entire air-gap.

The outer stator OS shows a longitudinal axis LA, which is aligned to the rotary axis RA. In this drawing both axes show the same position.

The outer stator OS is coupled with an actuating-unit AU in a way that an inclination of the longitudinal axis LA in reference to the rotary axis RA is achieved if needed. So it is possible to adjust the air-gap AG if needed.

The sensors S1 up to S4, which are used for the air-gap measurement, are connected with a data-processing-unit DPU, where the measured air-gap-distances or spacing AG1 to AG4 are evaluated. Based on this evaluation the data-processing-unit DPU controls the actuating-unit AU.

So the actuating-unit AU is controlled to position the outer stator OS and the inner rotor IR relatively to each other.

The sensors S1 to S4 are an integrated part of the outer Stator OS in a preferred embodiment.

In an improved embodiment a hall-sensor is used as sensor, but any suitable kind of sensor for this purpose may be used.

The actuating-unit AU is designed to allow a fast alignment of the axis to adjust the air-gap AG. For this purpose a hydraulic system with a pressure-accumulator could be used.

In a preferred embodiment fast acting valves, which are similar to those used in anti locking systems, are used as a low cost solution for the actuating-unit AU. This allows a secured control of the air-gap.

The adjustment of the air-gap can be done by any suitable arrangement, which is coupled with the static and/or the moving part to change their relative position in reference to each other.

So it is also possible to use a hydraulic-system for this purpose.

By help of a feedback loop, comprising the air-gap sensors S1 to S4, the data-processing-unit DPU and the actuating-unit AU a closed loop control of the air-gap AG is realized.

The closed loop control allows the implementation of a feed-forward algorithm, which improves the response time and the accuracy of the loop. This is especially advantageous for large machines like generators, used within wind-turbines or in hydro-power applications.

Figure 2:
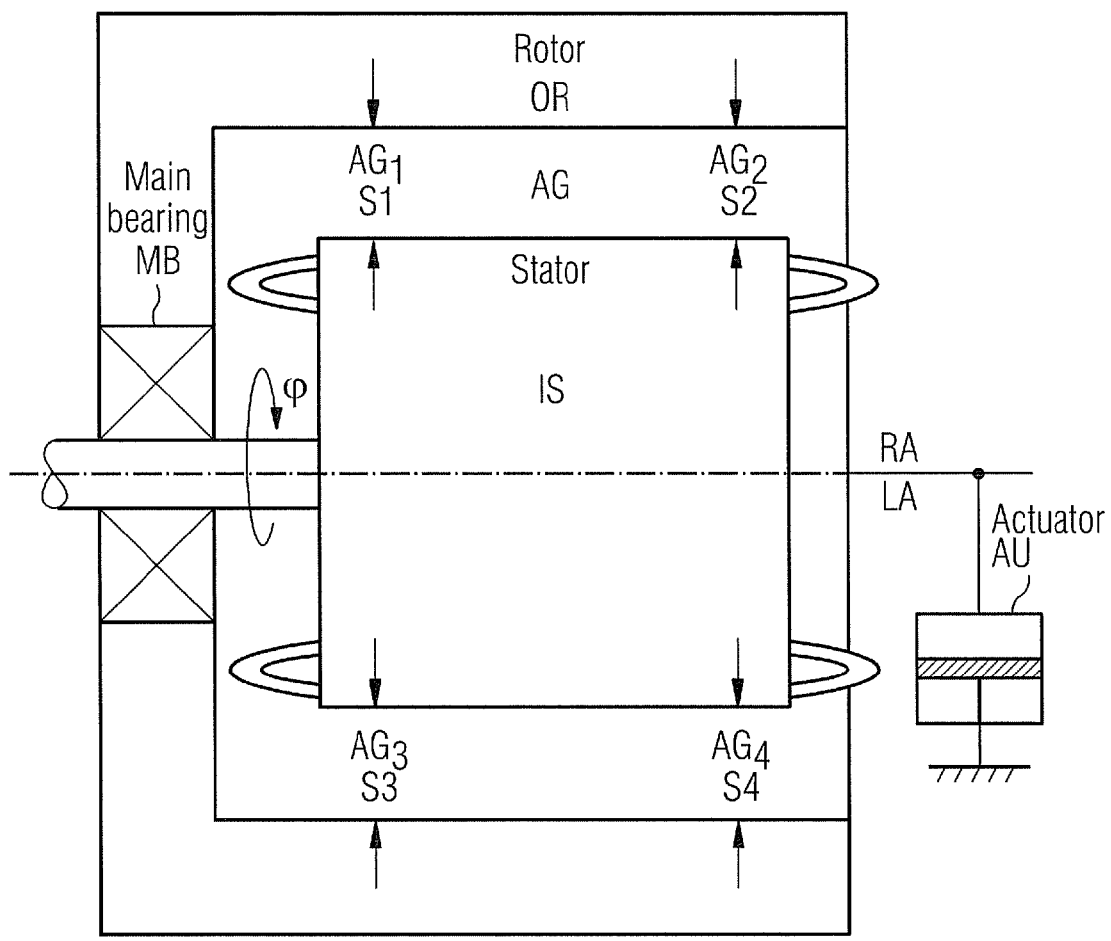
FIG. 2 shows the invention used at an electrical machine with an inner stator and an outer rotor.

FIG. 2 shows the invention used at an electrical machine with an inner stator IS and an outer rotor OR.

The outer rotor OR rotates around a dedicated rotary axis RA, so a rotation in relation to the inner stator IS is achieved.

The rotation is allowed by help of so called main-bearings MB, where one is shown here.

An air-gap AG is located between the outer rotor OR and the inner stator IS, while the spacing AG1, AG2, AG3, AG4 of the air-gap AG between the outer rotor OR and the inner stator IS is measured at e.g. four positions by help of sensors S1 to S4.

It is also possible to use a rotating line sensor, which is measuring the entire air-gap.

It is also possible to use only one single sensor or even a number of sensors, which might be positioned in a line to measure the entire air-gap.

The inner stator IS shows a longitudinal axis LA, which is aligned to the rotary axis RA. In this drawing both axes are identical as they show the same position.

The inner stator IS is coupled with an actuating-unit AU in a way that an inclination of the longitudinal axis LA in reference to the rotary axis RA is achieved if needed. So it is possible to adjust the air-gap AG.

The sensors S1 up to S4, which are used for the air-gap measurement, are connected with a data-processing-unit DPU (referring to FIG. 1), where the measured air-gap-distances or spacing AG1 to AG4 are evaluated. Based on this evaluation the data-processing-unit DPU controls the actuating-unit AU.

So the actuating-unit AU is controlled to position the outer stator OS and the inner rotor IR relatively to each other.

The sensors S1 to S4 are an integrated part of the inner Stator IS in a preferred embodiment.

In an improved embodiment a hall-sensor is used as sensor, but any suitable kind of sensor for this purpose may be used.

The actuating-unit AU is designed to allow a fast alignment of the axis to adjust the air-gap AG. For this purpose a hydraulic system with a pressure-accumulator could be used.

In a preferred embodiment fast acting valves, which are similar to those used in anti locking systems, are used as a low cost solution for the actuating-unit AU. This allows a secured control of the air-gap.

The adjustment of the air-gap can be done by any suitable arrangement, which is coupled with the static and/or the moving part to change their relative position in reference to each other.

So it is also possible to use a hydraulic-system for this purpose.

By help of a feedback loop, comprising the air-gap sensors S1 to S4, the data-processing-unit DPU, the actuating-unit AU and the air-gap sensors S1 to S4, a closed loop control of the air-gap AG is realized.

The closed loop control allows the implementation of a feed-forward algorithm, which improves the response time and the accuracy of the loop. This is especially advantageous for large machines like generators, used within wind-turbines or in hydro-power applications.

FIG. 3 shows the invention used at an electrical machine with an outer stator OS and an inner rotor IR, which the inner rotor IR and the outer stator OS show a conical shape.

Figure 3A:
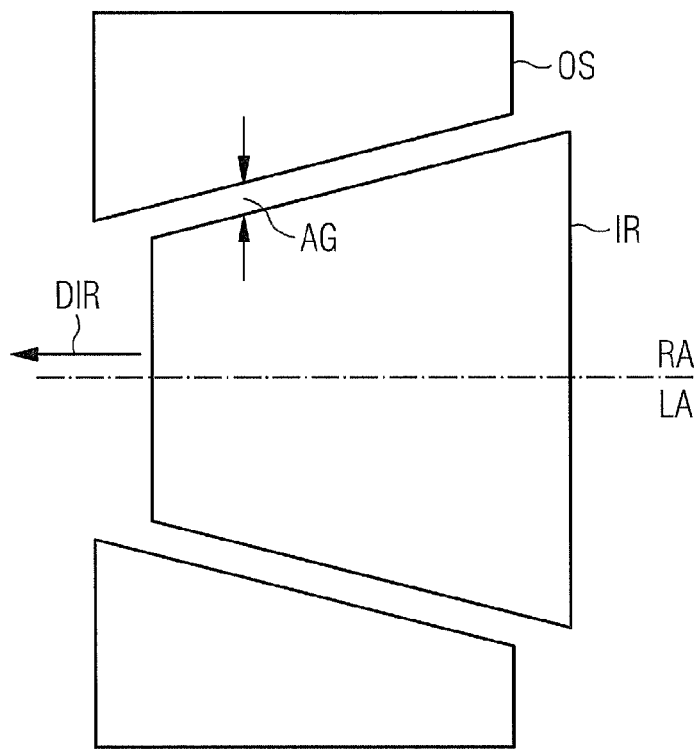
FIG. 3A and FIG. 3B show the invention used at an electrical machine with an outer stator and an inner rotor, which are of conical shape.
Figure 3B:
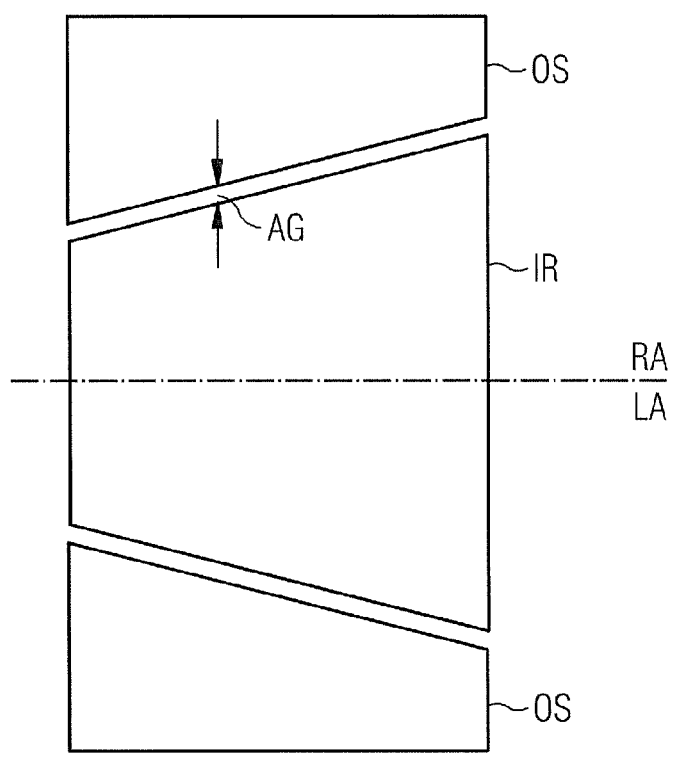

FIG. 3A shows the adjustment of the air-gap AG, while FIG. 3B shows the adjusted air-gap AG.

In this case and only exemplary the outer stator OS is coupled with an actuating-unit (not shown here in detail) in a way, that the relative position of the outer stator OS is changed along a line DIR in regard to the position of the inner rotor IR. This change of the position is done along the rotational axis RA, which is identical to the longitudinal axis LA. So the air-gap AG is adjusted by the movement of the components.

It is also possible to adjust the air-gap additionally by changing the relative position by help of a radial movement, for example of the outer stator OS.

FIG. 4 shows the invention used at an electrical machine with an outer stator OS and an inner rotor IR, which are segmented.

Figure 4A:
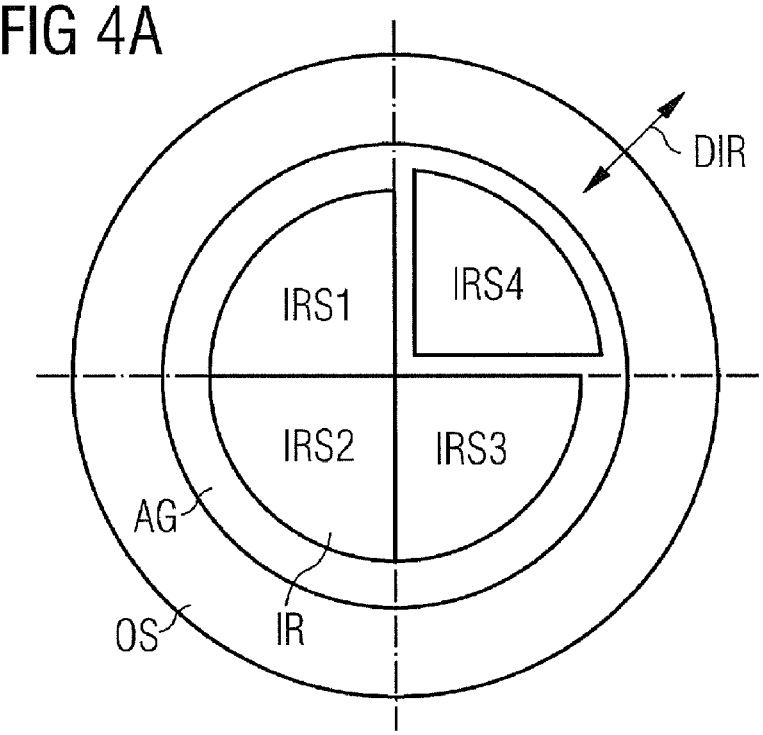
FIG. 4A and FIG. 4B show the invention used at an electrical machine with an outer stator and an inner rotor, where parts of the stator and/or the rotor can be adjusted in radial direction.
Figure 4B:
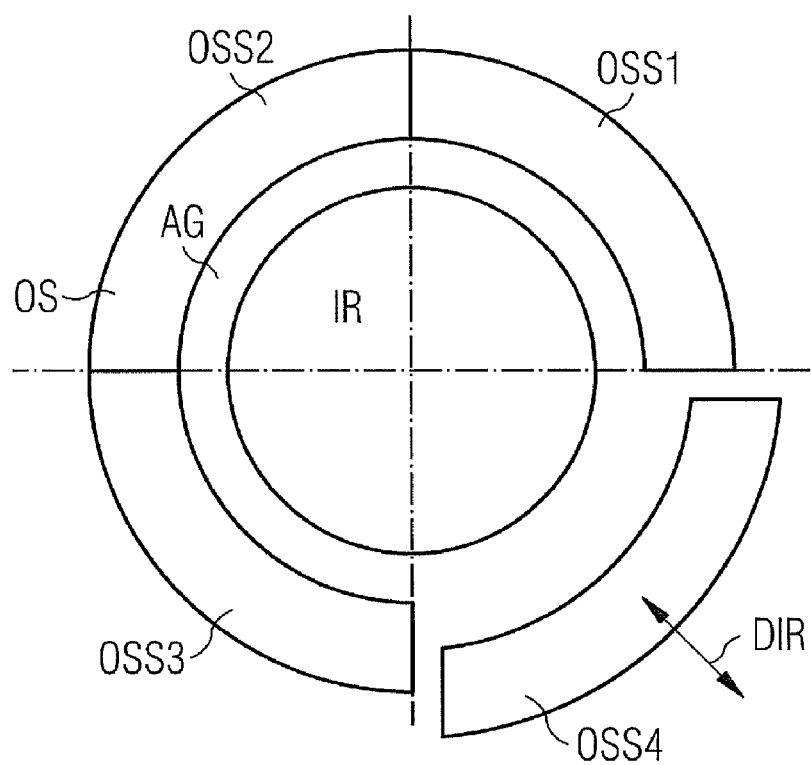

FIG. 4A shows an adjustment of the air-gap AG by help of a segmented inner rotor IR, while FIG. 4B shows an adjustment of the air-gap AG by help of a segmented outer stator OS.

FIG. 4A shows a segmented inner rotor IR comprising of four segments IRS1, IRS2, IRS3 and IRS4.

If the segment IRS4 is moved in direction DIR the air-gap AG is adjusted.

FIG. 4B shows a segmented outer stator OS comprising of four segments OSS1, OSS2, OSS3 and OSS4.

If the segment OSS4 is moved in direction DIR the air-gap AG is adjusted.

It is also possible to combine the ideas of the figures described above in part or even together to adjust the air-gap.

The invention claimed is:

1. An arrangement to adjust an air-gap of an electrical machine, comprising:
    a movable outer rotor;
    a static inner stator, the movable outer rotor rotates in relation to the static inner stator around a dedicated rotary axis, the static inner stator includes a longitudinal axis aligned to the rotary axis of the movable outer rotor;
    the air-gap located is between the movable outer rotor and the static inner stator of the machine;
    a sensor measures the spacing of the air-gap; and
    an actuating unit is configured to adjust the spacing of the air gap based on the measured spacing of the air gap, the actuating unit acts on the static inner stator to change the position of the static inner stator and/or acts on the movable outer rotor to change the position of the movable outer rotor,
    wherein the electrical machine is a generator.

2. The arrangement according to claim 1, wherein
    the static inner stator is coupled with the actuating-unit such that an inclination and/or a shift of the longitudinal axis in reference to the rotary axis is achieved to adjust the air-gap, while the adjustment is done in based on the measured spacing of the air-gap.

3. The arrangement according to claim 1, wherein
    the static inner stator and/or the movable outer rotor is segmented into a plurality of components,
    the air-gap is adjusted by a change of the position of at least one of the plurality of components.

4. The arrangement according to claim 1, further comprising:
    the sensor is positioned inside the electrical machine such that a measurement of the spacing of the air-gap occurs during the operation of the electrical machine.

5. The arrangement according to claim 4, wherein:
    the sensor is an integrated part of the movable outer rotor and/or of the static inner stator of the electrical machine.

6. The arrangement according to claim 4, wherein:
    the sensor is a hall-sensor.

7. The arrangement according to claim 1, further comprising:
    a plurality of sensors measure the spacing of the air gap and are connected with a data-processing-unit, which is used to evaluate the measured spacing and which is connected with the actuating-unit, to control the adjustment.

8. The arrangement according to claim 1, wherein
    the static inner stator and/or the movable outer rotor includes a conical shape, and the change of the relative position is done in relation to the conical shape to adjust the air-gap.

9. The arrangement according to claim 1, wherein
    the actuating-unit comprises a hydraulic system that acts on the static inner stator to allow the air-gap adjustment.

10. The arrangement according to claim 1, wherein
    the actuating-unit comprises fast acting valves that act on the static inner stator to allow the air-gap adjustment.

11. An arrangement to adjust an air-gap of an electrical machine, comprising:
    a movable part of the electrical machine;
    a static part of the electrical machine, the movable part rotates in relation to the static part around a dedicated rotary axis;
    the air-gap located between the rotating and the static part of the machine;
    a device measures the spacing of the air-gap; and
    an actuating unit coupled to the static part and/or the movable part to change the position of the static part and/or moving part to adjust the spacing of the air-gap, wherein
    the static part and/or the movable part includes a conical shape, and the change of the relative position is done in relation to the conical shape to adjust the air-gap.

12. An arrangement to adjust an air-gap of an electrical machine, comprising:
    a movable part of the electrical machine;
    a static part of the electrical machine, the movable part rotates in relation to the static part around a dedicated rotary axis;
    the air-gap located between the rotating and the static part of the machine;
    a device measures the spacing of the air-gap; and
    an actuating unit coupled to the static part and/or the movable part to change the position of the static part and/or moving part to adjust the spacing of the air-gap, wherein
    the actuating-unit comprises a hydraulic system that acts on the static part to allow the air-gap adjustment, or
    the actuating-unit comprises fast acting valves that act on the static part to allow the air-gap adjustment.

13. The arrangement according to claim 12, wherein the actuating-unit comprises a hydraulic system with a pressure-accumulator.

14. A method to adjust an air-gap of an electrical machine, comprising:
    measuring a spacing of the air-gap between a movable part and a static part of the machine, the movable part of the machine rotates in relation to a static part of the machine around a dedicated rotary axis; and
    changing a relative position between the movable part and the static part to adjust the spacing of the air-gap,
    wherein the adjustment is dependent on the measured spacing of the air-gap, and
    wherein the static part and/or the movable part show a conical shape and where the change of the relative position is done in relation to the conical shape to adjust the air-gap.

* * * * *